United States Patent
Adluri

(10) Patent No.: US 10,929,816 B2
(45) Date of Patent: Feb. 23, 2021

(54) SYSTEMS AND METHODS FOR MESSAGE TRANSMISSION AND RETRIEVAL USING BLOCKCHAIN

(71) Applicant: Advanced Messaging Technologies, Inc., Los Angeles, CA (US)

(72) Inventor: Mahender Adluri, Tustin, CA (US)

(73) Assignee: ADVANCED MESSAGING TECHNOLOGIES, INC., Los Angeles, CA (US)

(*) Notice: Subject to any disclaimer, the term of this patent is extended or adjusted under 35 U.S.C. 154(b) by 99 days.

(21) Appl. No.: 16/173,818

(22) Filed: Oct. 29, 2018

(65) Prior Publication Data
US 2020/0134565 A1 Apr. 30, 2020

(51) Int. Cl.
| | |
|---|---|
| *G06F 15/16* | (2006.01) |
| *G06Q 10/10* | (2012.01) |
| *H04L 9/08* | (2006.01) |
| *H04L 9/06* | (2006.01) |
| *H04L 12/58* | (2006.01) |
| *H04L 29/06* | (2006.01) |

(Continued)

(52) U.S. Cl.
CPC ......... *G06Q 10/107* (2013.01); *G06F 16/182* (2019.01); *G06F 16/27* (2019.01); *H04L 9/0643* (2013.01); *H04L 9/0838* (2013.01); *H04L 51/046* (2013.01); *H04L 63/06* (2013.01); *H04L 2463/082* (2013.01)

(58) Field of Classification Search
CPC ..... G06Q 10/107; G06F 16/27; G06F 16/182; H04L 9/0643; H04L 9/0838; H04L 51/046; H04L 63/06

USPC .................................................. 709/219, 223
See application file for complete search history.

(56) References Cited

U.S. PATENT DOCUMENTS

| | | | |
|---|---|---|---|
| 10,097,356 | B2 | 10/2018 | Zinder |
| 2016/0283920 | A1* | 9/2016 | Fisher ............... G06Q 20/02 |
| 2017/0236120 | A1 | 8/2017 | Herlihy et al. |

(Continued)

FOREIGN PATENT DOCUMENTS

| | | |
|---|---|---|
| KR | 101795695 | 12/2017 |
| KR | 10-2018-0029695 | 3/2018 |

OTHER PUBLICATIONS

"System and Method for Transmitting data Using Block-Chain," Translation of KR20180029695, Kim Dong Man, Mar. 21, 2018. (Year: 2018).*

(Continued)

*Primary Examiner* — Philip B Tran
(74) *Attorney, Agent, or Firm* — Womble Bond Dickinson (US) LLP

(57) ABSTRACT

Systems and methods for message transfer and retrieval are provided. According to some aspects, message information is received from a sender, and a message can be created based on the received message information. A hash of the message and transaction information related to the message can be generated and provided to a current block in a blockchain. The message is transferred or otherwise provided to a receiver, and upon receipt and validation of authentication information from the receiver, access to the received message is provided to the receiver. A hash of the received message and additional transaction information related to the received message is generated and provided to a current block in the blockchain. Other aspects also are provided.

20 Claims, 4 Drawing Sheets

(51) Int. Cl.
    *G06F 16/27* (2019.01)
    *G06F 16/182* (2019.01)

(56) References Cited

U.S. PATENT DOCUMENTS

| | | | |
|---|---|---|---|
| 2017/0279801 A1* | 9/2017 | Andrade | H04L 63/0861 |
| 2017/0345011 A1* | 11/2017 | Salami | G06Q 20/42 |
| 2017/0359288 A1 | 12/2017 | Golan | |
| 2018/0123779 A1* | 5/2018 | Zhang | H04L 9/0637 |
| 2018/0145836 A1* | 5/2018 | Saur | H04L 9/3236 |
| 2019/0013933 A1* | 1/2019 | Mercuri | G06F 21/602 |
| 2019/0034926 A1* | 1/2019 | Davis | G06Q 20/401 |
| 2019/0124146 A1* | 4/2019 | Austin | H04L 9/3236 |
| 2019/0188706 A1* | 6/2019 | McCurtis | G06Q 20/40 |
| 2019/0243980 A1* | 8/2019 | Inamdar | H04L 9/0643 |
| 2019/0311148 A1* | 10/2019 | Andrade | H04L 63/102 |

OTHER PUBLICATIONS

International Search Report and Written Opinion for International Application No. PCT/US2019/049218 dated Dec. 20, 2019, 7 pages.

* cited by examiner

SYSTEMS AND METHODS FOR MESSAGE TRANSMISSION AND RETRIEVAL USING BLOCKCHAIN

Aspects of the present disclosure relate to systems and methods for message transmission and retrieval, for example, systems and methods for secured, immutable message transmission and retrieval using blockchain. Other aspects also are described.

BACKGROUND

Current message transmission and retrieval systems generally are susceptible to hacking, tampering, or other interference by bad faith actors, and further may not offer reliable, immutable transaction histories/details or ways to quickly view such histories/details. Blockchain technology, however, generally offers an environment that provides high levels of security, compliance, transparency, and trust among senders and receivers, and also offers trust and security by applying cryptography to ensure the safety of transactions and transaction histories that can be made available to every participant instantly. Accordingly, it can be seen that a need exists for systems and methods for sending highly secured, immutable message transmission and retrieval using blockchain. The present disclosure addresses the foregoing and other related, and non-related, issues in the art.

SUMMARY

In one aspect, the present disclosure relates to a system for highly secured, immutable message transmission and retrieval using blockchain.

The system can facilitate message transmission and retrieval between a plurality of electronic devices (e.g., two or more electronic devices) managed by participants. The electronic devices can include smart phones, tablets, laptop computers, desktop computers, networked appliances, voice assistant devices, etc., or other suitable electronic devices or combinations thereof.

In some variations, the system can include a messaging platform or application that allows the participants (e.g., senders and receivers) to generate, send, retrieve, or access messages, including but not limited to text messages, email messages, facsimiles, audio messages, video messages, images, etc. For example, senders and receivers can generate, access, etc. the messaging platform by signing up for an account using an electronic device, such as through a website or a mobile application. In particular, senders and receivers can log into the website or mobile application using participant generated credentials or other suitable verification/authentication methods.

Senders then can create and upload message information, e.g., text, audio, video, etc. into one or more inputs of their electronic devices, e.g., keyboards, touch screens, microphones, cameras, etc. The system further can include a message generator or other suitable components or modules that generate a message or messages based on the received message information.

In addition, the system can generate a hash of the message, e.g., using a hash generator or other suitable modules or components. For example, the system can apply a built-in hash function (e.g., SHA256 or RIPEMID function) to electronic data or information of, or otherwise related to, the generated messages, e.g., to convert any input length to an output of a fixed length.

The system further generates transaction information, e.g., using a transaction generator or other suitable module or components, and provides the generated transaction information to a current block of a blockchain. The generated hash also can be provided to the current block of the blockchain. The transaction information includes but is not limited to a transaction identifier (which, e.g., can include the hash of the message), a message type, identifiers for the participants, a status of the message, time information (e.g., dates and times) related to the message or any other suitable information, or combinations thereof.

The system then can transfer the message or otherwise make the message available to another participant (other participants), e.g., a receiver(s). Optionally, the system can notify the receiver(s), e.g., using one or more notification generators or other suitable components or modules, that the message is available for review. Upon receipt of the notification and to access the message, the receiver can access and log into the website or mobile application, though the receiver additionally or alternatively can provide a crypto key or other validation information, e.g., for accessing the crypto application or crypto email.

Thereafter, the receiver can view or otherwise access the message, e.g., using a message access interface or other suitable component/module of the system, and upon the receiver's viewing/accessing of the message, the system, e.g., the transaction generator of the system, can generate and provide additional transaction information to a current block in the blockchain. The additional transaction information includes but is not limited to a transaction identifier (e.g., including the hash of the received message), a message type, identifiers for the participants, a status of the message, and time information (e.g., dates and times) related to the message or any other suitable information, or combinations thereof.

Still further, the system provides or otherwise makes available an immutable transaction history for the generating, transmission, and receipt of each of the messages. The transaction history can include information from the blockchain. For example, the system can display, provide, or otherwise make available a dashboard or other grouping of information providing information or analytics/statistics related to the transaction or additional information provided to the blockchain, e.g., to track participant usage, behavior, etc.

In one aspect, a method or process for message transmission and retrieval between a plurality of participants is provided. With this method/process, message information can be received from a first device managed by a first participant or sender. A message or messages then can be generated based on the received message information. Thereafter, a hash of the message and transaction information related to the message can be generated. The transaction information and the hash of the message are provided to a current block in a blockchain. The message further is transferred to a second device managed by a second participant or receiver. Optionally, a notification can be provide to the second participant or receiver indicating that a message is available or has been received. In one variation, authentication or verification information is requested/required from the second participant/receiver to access the received message, and upon receipt and validation of the authentication information, access is provided to the received message on the second device. Additionally, a hash of the received message and additional transaction information related to the received message can be generated. The hash of the received message and the additional transaction information also can be provided to a current block in the blockchain.

The above summary does not include an exhaustive list of all the aspects of the present disclosure. It is contemplated that the disclosure include all systems and methods that can be practiced from all suitable combinations of the various aspects summarized above, as well as those disclosed in the detailed description below and particularly pointed out in the claims filed with the application. Such combinations have particular advantages not specifically recited in the above summary.

Various objects, features and advantages of the present disclosure will become apparent to those skilled in the art upon a review of the following detail description, when taken in conjunction with the accompanying drawings.

BRIEF DESCRIPTION OF THE FIGURES

Several aspects of the disclosure are illustrated by way of example and not by way of limitation in the figures of the accompanying drawings in which like references include similar elements. It should be noted that references to "an" or "one" aspect in this disclosure are not necessarily to the same aspect, and they mean at least one. Also, in the interest of conciseness and reducing the total number of figures, a given figure may be used to illustrate features of more than one aspect of the disclosure, and not all elements in the figure may be required for a given aspect.

The use of the same reference symbols in different drawings indicates similar or identical items.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
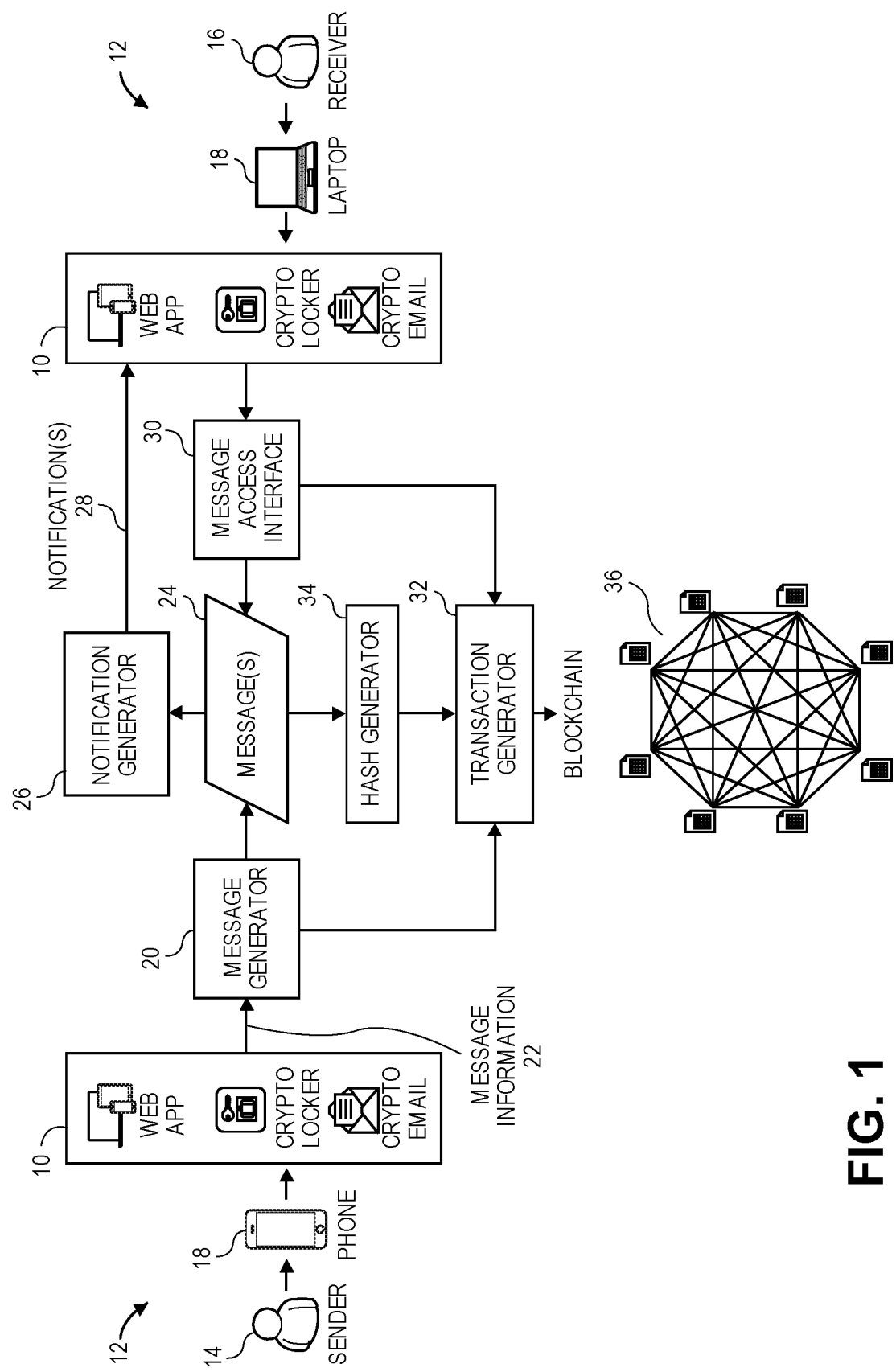
FIG. 1 shows a schematic view of a system for secure message transmission and retrieval using blockchain according to one aspect of the present disclosure.

FIG. 1 shows a schematic view of a system for secure message transmission and retrieval using blockchain. As shown in FIG. 1, the system can include a messaging platform 10 having or accessing a web-based application, mobile application, email application, crypto application (e.g., an application that provides a crypto key or other suitable verification information via a secure email or using other suitable secure information transfer means), or other suitable application, computer program product, etc. that facilitates generating, sending, retrieving, or accessing messages, such as messages including but not limited to textual messages, e.g., text messages, email messages, facsimiles (e.g., word documents, PDFs or other suitable facsimile file format), audio messages (e.g., WAV or other suitable audio file formats), or visual messages (e.g., JPEG, GIF, etc., or WMV or other suitable video file formats).

The platform 10 generally is accessed by a plurality of participants 12, such as one or more senders 14 and one or more receivers 16, using one or more electronic devices 18. The electronic devices 18 include but are not limited to handheld mobile devices, such as mobile phones, Smart phones, tablets, PDAs, or other suitable mobile computing devices. In addition, or in the alternative, the electronic devices 18 can include personal computing devices, such as laptops, desktops, work stations, etc., though any suitable computing devices (e.g., networked appliances, smart speakers, etc.) can be used without departing from the present disclosure. The devices 18 accessing or running the messaging platform 10 also can be configured to access one or more networks, such as the Internet, peer to peer networks, or any other suitable private or public networks or combinations thereof, to enable participants to upload, generate, and access messages or information related thereto. The devices 18 can access the network through wired connections, e.g., an Ethernet cable, or wireless connections, e.g., WiFi, Bluetooth®, cellular connections, e.g., 3G, 4G, LTE, 5G, etc., or combinations thereof.

In one aspect, the platform 10 generally requires participants 12 to provide authentication information or other types of verification information before access is granted thereto. For example, participants 12 can register with a website or mobile application, such as by generating user authentication credentials (e.g., a user name and password or other suitable authentication information), obtaining one or more certificates, tokens, etc. or using other multifactor authentication methods, or any other suitable authentication/verification methods, or combinations thereof. In one variation, if a user/participant, e.g., a receiver 16, is not registered with the platform 10, a sender 14 may be able to provide the receiver 16 temporary access to the platform 10 and messages, e.g., using a crypto application. For example, the crypto application can provide a crypto key (e.g., public/ private keys, RSA Tokens, etc.) or other authentication information to the receiver 16 using secure message transfer, such as a secured email application, SMS, etc. The receiver 16 then can access the crypto application or other components of the platform 10 using the crypto key to view or otherwise access received messages. The crypto key may expire after a predetermined time period, such as 6 hours, 12 hours, 1 day, 2 days, or up to one week, though any suitable time period can be selected without departing from the scope of the present disclosure.

As further shown in FIG. 1, the system can include a message generator 20 or other suitable component or module that generates messages, such as textual messages, such as text messages, emails, facsimiles, etc.; audio messages; visual messages, such as images or videos; etc., based on received message information 22 provided by a sender 14. For example, the sender 14 can provide message information 22 using one or more inputs (e.g., keyboards, microphone, cameras, etc.) of their electronic device 18. Then, based on this received/inputted messaged information 22, the message generator 20 can generate one or more messages 24, which can be provided to or otherwise be made available to a receiver(s) 16.

Optionally, the system can notify the receiver(s) 16 that a message 24 is available. For example, the system can include a notification generator 26 or other suitable module or component that provides notifications 28 to the receiver(s) 16 that a message or messages 24 have been provided by, or are otherwise available from, a sender 14. The notifications 28 can include alerts, e.g., a text message or email, notifications, e.g., push notifications, or any other suitable notifications or alerts without departing from the scope of the present disclosure. The receiver 16 can access the message 24 using a message access interface 30, which can include any suitable interface for displaying, showing, playing, etc. of the message 24.

The system further can include a transaction generator 32 or other suitable component or module that generates transaction information, e.g., including information related to the generation or sending of the message(s) 24 by a sender 14 or retrieval or other accessing of the message(s) by a receiver 16. The transaction generator 32 can generate transaction information related to generated, or received/accessed, messages including but not limited to a transaction identifier, a message type, identifiers for the participants, a status of the message, and time information (e.g., dates and times) related to the generated and received messages.

FIG. 1 further shows that the system can include a hash generator 34 or other suitable component or module for generating a hash value related to the messages 24. For example, the hash generator 34 can apply a cryptographic hash function to electronic data or information related to the generated and/or retrieved messages 24. The hash function can include a SHA256 function, a RIPEMD function, or other suitable hash or cryptographic function that converts any input length to an output of a fixed length. In some variations, the transaction identifier included in the transaction information includes the hash value of the generated or retrieved messages.

The system further can include a blockchain 36 having a plurality of blocks that store the transaction information, as generally shown in FIG. 1. For example, for each transaction (e.g., generating, sending, retrieval, receipt, accessing, etc. of messages), transaction information and a hash value of the message can be generated and provided to a current block in a blockchain. In some variations, the blockchain 36 can be stored in a memory or storage of the system, such as cloud-based storage, e.g., Amazon Web Services ("AWS"), InterPlanetary File Systems, etc. or other suitable memories or storage systems. Accordingly, an immutable transaction history of the generated and received messages can be provided. For example, the system can provide a dashboard (e.g., to displays of the devices 18 or to other devices in communication with the system, such as devices managed by a system administrator) including information from the blockchain, and, e.g., providing a quickly accessible transaction history, as well as a way to track participant behavior and usage of the messaging platform 12.

In some examples, the various components or modules (e.g., message generator 20, notification generator 26, hash generator 34, transaction generator 32, etc.) of the system can be resident on the electronic devices 18. For example, one or more components/modules of the system can be stored in a memory and executed or otherwise accessed by processor(s) of the electronic devices 18. In addition or in the alternative, however, one or more components of the messaging platform 12 can be stored and/or accessed from other computing devices (e.g., having processors and memories and/or storages) in communication with the devices 18, or can be cloud-based. For example, one or more components of the messaging platform 12 can be web-based or cloud-based and can be stored and accessed from one or more memories or storages of a computing device (such as a server) that is part of a data management center managed by a messaging service provider or other suitable entity.

Persons of ordinary skill in the art will understand that, though the components/modules of the system (e.g., message generator 20, notification generator 26, hash generator 34, transaction generator 32, etc.) are shown as separate components/modules in FIG. 1, the functions, operations, steps, etc. performed thereby equivalently can be performed by a single, or any number of, modules/components running or accessed by the devices 18.

The electronic devices 18 generally include at least one processor, such as a central processing unit (CPU) or hardware or software control logic, ROM, and/or other types of nonvolatile memory, and at least one storage or memory, such as random access memory (RAM) or (ROM). The electronic devices 18 further may include one or more ports for communicating with external devices and various input and output (I/O) devices, such as a keyboard, a mouse, touchscreen and/or a video display. However, the managed devices 18 may include any suitable computing components operable to compute, calculate, determine, classify, process, transmit, receive, retrieve, originate, switch, store, display, communicate, manifest, detect, record, reproduce, handle, or utilize any form of information or data for any suitable purpose.

Figure 2A:
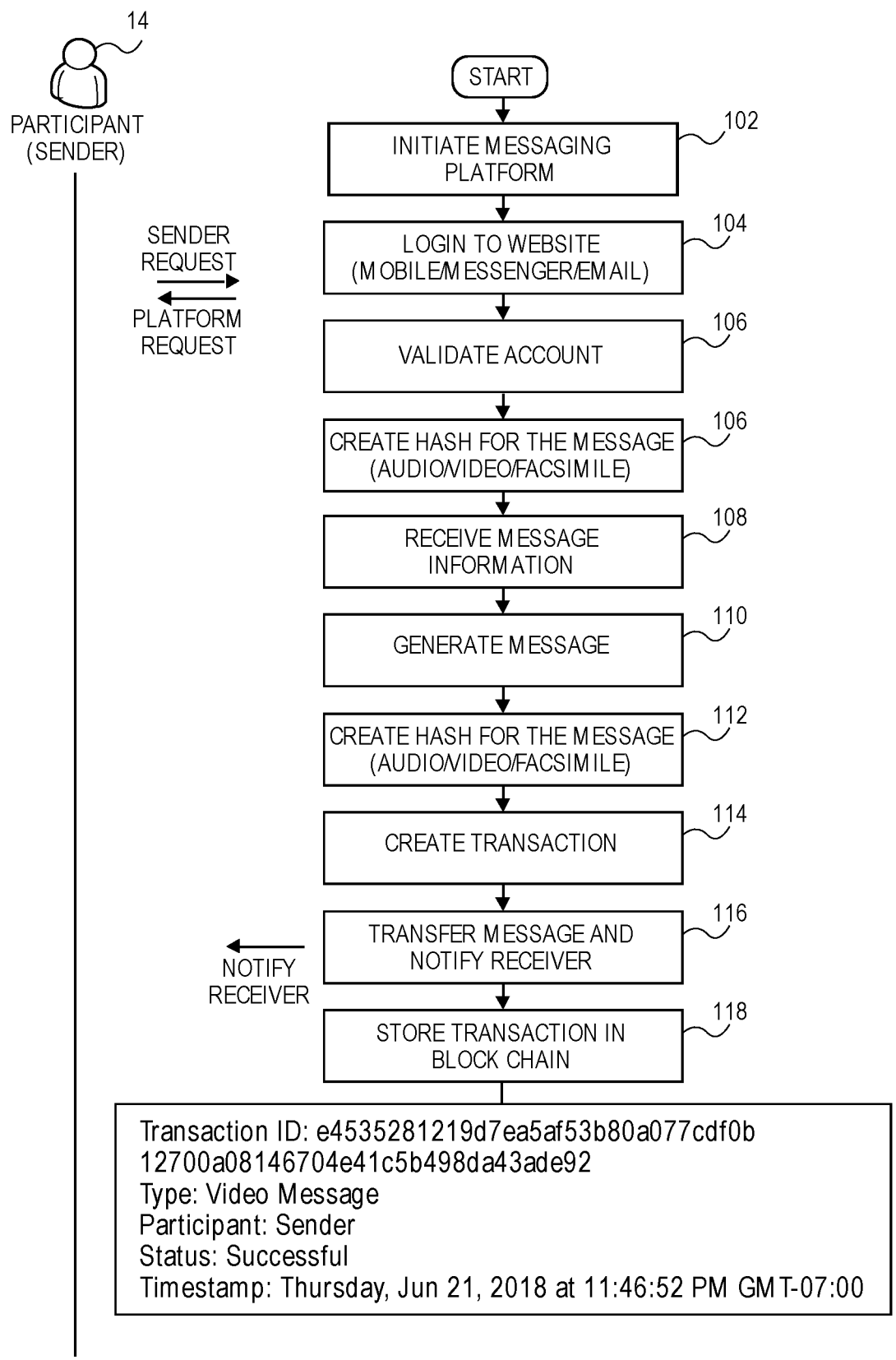
FIGS. 2A and 2B show a flowchart for a process for secure message transmission and retrieval using blockchain according to one aspect of the present disclosure.
Figure 2B:
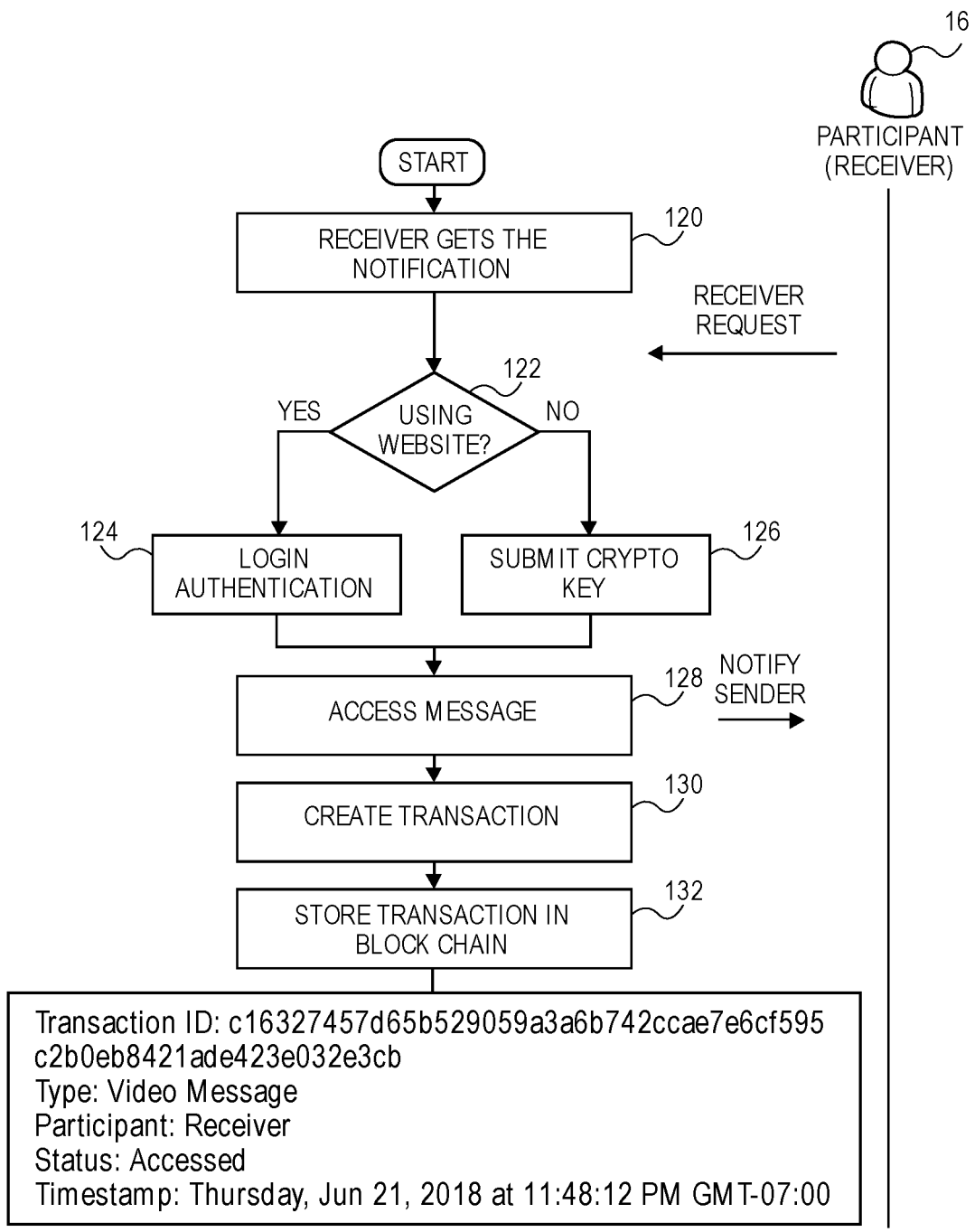

FIGS. 2A and 2B show a flowchart for a method or process for secured message transmission and retrieval using blockchain. As shown in FIG. 2A, at 102, a first participant or sender 14 launches or otherwise initiates the messaging platform 12. For example, at 104, the participant or sender 14 may access and log in to a website, mobile application, crypto application, or email service to access the messaging platform 12. The messaging platform 12 may validate the sender's account based on authentication credentials (at 106). For example, the messenger platform 12 may determine whether the sender's authentication credentials are valid or match those of an existing account.

Thereafter, at 108, the sender 14 may provide message information (e.g., audio, visual, textual, etc.) for generation/creation of a message, which can include audio messages; visual messages, e.g., images or videos; textual messages, e.g., text messages, email messages, facsimile messages, etc., and at 110, the message platform can generate a message (or messages) based on the message information. Further, at 112, the messaging platform 12 generates a hash or hash value of the message. The messaging platform additional generates a transaction (at 114), and for example, the messaging platform generates transaction information related to the generated message.

As further shown in FIG. 2A, the messaging platform 12 transfers (or otherwise makes available) the message to the receiver, and optionally, can provide the receiver with a notification that the message has been transferred or is available (at 116). At 118, the messaging platform 12 also provides the transaction information generated in the transaction to a current block of the blockchain. The transaction information can include a transaction identifier, a message type, a participant identifier, the status of the message (e.g., successful, not successful, pending, etc.), time information, or any other suitable information or combination thereof. For example, in one variation as shown in FIG. 2A, the transaction identifier includes the hash value of the message; the message type includes information on whether the message is a textual, audio, or visual message; the participant identifier identifies the sender or participant providing the message information; the status includes information to indicate whether the message was successfully generated or sent to the receiver; and the time information includes a time (e.g., hour, minute, seconds) and a date (e.g., month, day, year) of when the message was generated or sent.

Turning to FIG. 2B, at 120, the receiver receives the notification that the message has been sent or is otherwise available. At 122, it then may be determined whether the receiver is attempting to access the message by logging into the website/mobile application or alternatively by submitting a crypto key or other authentication. For example, if a receiver 16 does not have an account with or access to the platform, the sender 14 can select the use of a crypto application to provide the receiver 16 with access to the message, which crypto application will generate and send a temporary crypto key (e.g., a public or private key, RSA token, etc.) to the receiver using secured email application, SMS, etc. Then, the receiver 16 can access the crypto application or other components of the platform using the crypto key to view or otherwise access the message, e.g., the textual, audio, or visual message. The crypto application also may allow the receiver 16 to respond to received messages without departing from the scope of the present disclosure.

If the receiver is logging into the website, the messaging platform 12 may request and verify login authentication information from the receiver 16 (at 124). If the receiver is not using a website, however, the messaging platform 12 may request that the receiver submit the crypto key, and also may validate the crypto key (at 126). Upon validation of the login authentication information or the crypto key, the messaging platform may provide the receiver 16 access to the message from the sender 12.

FIG. 2B further shows that, when the receiver accesses the message, the messaging platform generates a transaction including additional transaction information at 130. The additional transaction information can include a transaction identifier, a message type, a participant identifier, a status of the message, and time information. For example, in one variation, as shown in FIG. 2B, the transaction identifier includes the hash value of the received or accessed message; the message type includes information on whether the message is a text, audio, or video message; the participant identifier identifies the receiver or participant receiving the message information; the status includes information to indicate whether the message was successfully received or accessed by the receiver; and the time information includes a time (e.g., hour, minute, seconds) and a date (e.g., month, day, year) of when the message was received or accessed.

It will be understood by persons skilled in the art that any of the steps or actions (e.g., 102 to 132) shown in FIGS. 2A and 2B can be omitted or rearranged, without departing from the scope of the present disclosure. Further, additional steps can be carried out by the message platform 12, such as comparing the hash values of the generated and received messages, displaying information in the blockchain to provide an immutable transaction history or details, etc., without departing from the scope of the present disclosure.

Figure 3:
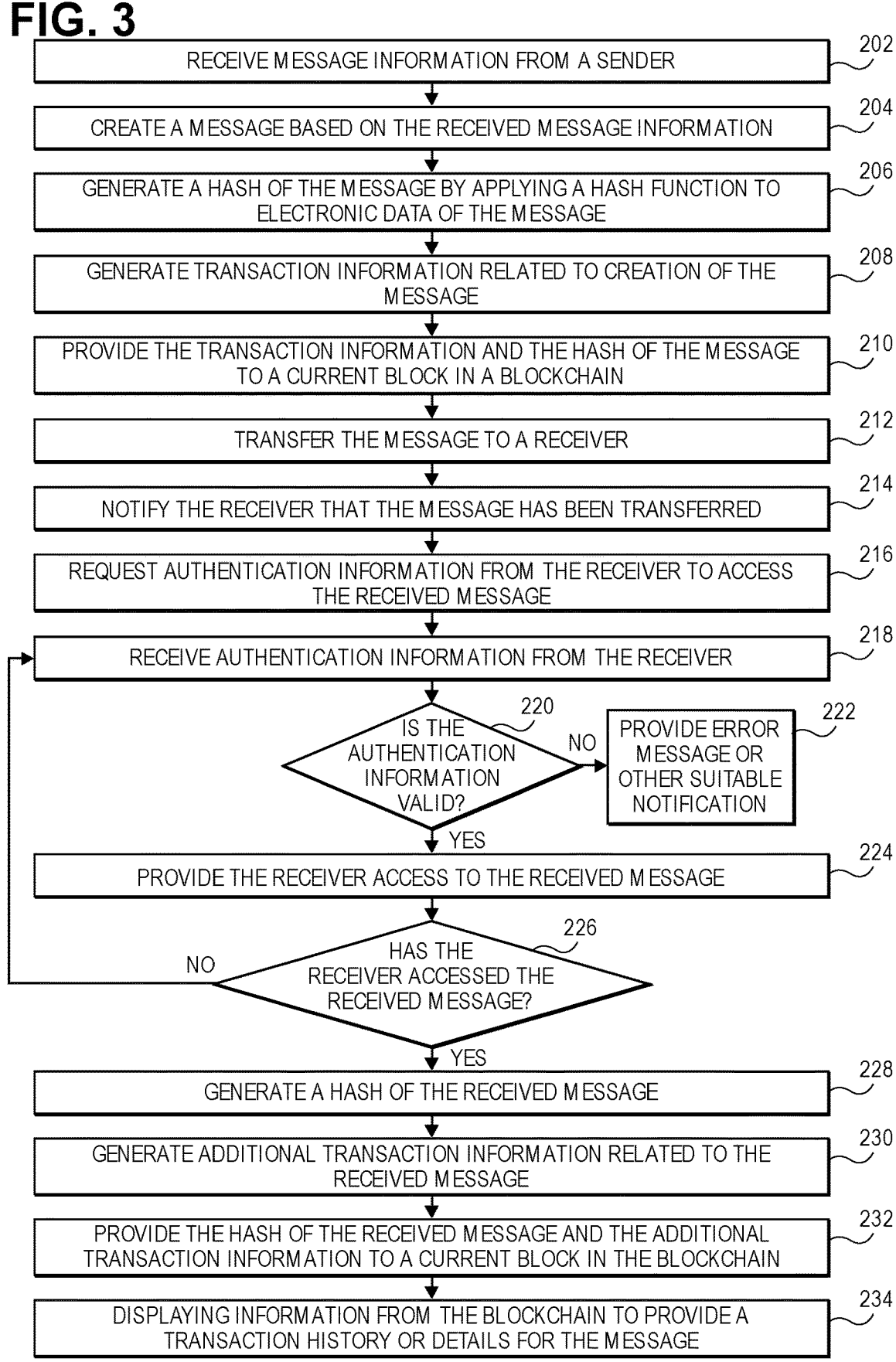
FIG. 3 shows a flowchart for process or method for secure message transmission and retrieval using blockchain according to one aspect of the present disclosure.

FIG. 3 shows a flowchart for a process or method for secure message transmission and retrieval using blockchain. As shown in FIG. 3, at 202, message information can be received from a sender (e.g., when the sender inputs message information into one or more inputs of their electronic device 18).

Then, at 204, a message is generated based on the received message information. A hash or hash value of the message also is generated, e.g., by applying a hash function to electronic data or information of the message (at 206), and transaction information related to the creation of the message is generated (at 208). The transaction information and the hash (or hash value) of the message are provided to a current block in a blockchain (at 210). Thereafter, at 212, the message is transferred or otherwise made available to a receiver, and the receiver is notified that the message has been transferred or is available at 214.

To access the message, authentication information is requested from the receiver (at 216). Upon receipt of the authentication information from the receiver (at 218), it is determined whether the authentication information is valid (at 220). If the authentication information is not valid, an error message or other suitable notification or alert is provided to the receiver (at 222), and the receiver can be requested/prompted to again provide valid authentication information. Once the receiver provides valid authentication information, the receiver is provided access to the message (at 224).

It can then be determined whether the receiver has accessed the received message (at 226). If the receiver has access to the received message, a hash value of the received message can be generated (at 228). If the receiver has not accessed the message(s), e.g., within a prescribed time period, the authentication information may again be required from the receiver to access the message(s) (e.g., the process may return to 218, or in the alternative, to 216 in which the receiver will be again prompted for their authentication information).

Further, additional transaction information can be generated that is related to the received message (at 230). The hash or hash value of the received message and the additional transaction information can be provided to a current block in the blockchain (at 232). Still further, at 234, information in or related to information in the blockchain can be provided/displayed to provide an immutable transaction history for the message It will be understood by persons skilled in the art that any of the steps or actions (e.g., 202 to 234) shown in FIG. 3 can be omitted or rearranged, or additional steps/actions can be added, without departing from the scope of the present disclosure. For example, in some variations, the hash value of the original generated message from the sender and the hash value of the message retrieved by the receiver can be compared, e.g., to determine whether the message has been tampered with or otherwise altered. For example, if the hash value of the original message and the hash value of the received message do not match or correspond, an alert or notification can be provided to the sender or receiver or other participants/entities.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method for secure message transfer between a plurality of participants, comprising:
receiving message information from a first device managed by a first participant of the plurality of participants;
creating a message based on the received message information;
generating a hash of the message and generating transaction information related to the message;
generating a block for a blockchain and providing the transaction information related to the message and the hash of the message in the block;
making the message available to a second device managed by a second participant of the plurality of participants using a message access interface that provides access to the message by the second device;
notifying the second participant that the message is available for access and requesting authentication information from the second participant to enable access to the message using the second device,
providing access to the message on the second device upon receipt and validation of the authentication information from the second participant;
when the message is accessed by the second device, generating a hash of the accessed message and generating additional transaction information related to the accessed message; and
providing the hash of the accessed message and the additional transaction information to the block or one or more additional blocks generated for the blockchain.

2. The method of claim 1, wherein the message comprises an audio message, a visual message, or a textual message.

3. The method of claim 1, wherein generating a hash of the message includes applying a hash function to electronic data of the message.

4. The method of claim 3, wherein the hash function comprises a SHA256 or a RIPEMD function.

5. The method of claim 1, further comprising displaying information in the blockchain to provide a transaction history for the message.

6. The method of claim 1, wherein the transaction information includes a transaction identifier, a message type, a participant identifier, a status, and time information related to the message.

7. The method of claim 1, wherein the additional transaction information includes a transaction identifier, a message type, a participant identifier, a status, and time information related to the received message.

8. The method of claim 1, wherein the authentication information comprises multifactor authentication information.

9. The method of claim 1, wherein the authentication information includes a crypto key provided to the second participant.

10. A system for secure message transfer between a plurality of participants, comprising:
one or more processors; and
one or more non-transitory computer readable storage mediums having instructions stored therein, the instructions, when executed by the one or more processors, causes the system to:
receive message information from a first device managed by a first participant of the plurality of participants;
create a message based on the received message information;
generate a hash of the message and generate transaction information related to the message;
generate a block for a blockchain and provide the transaction information and the hash of the message in the block;
make the message available to a second device managed by a second participant of the plurality of participants using a message access interface that provides access to the message by the second device;
notify the second participant that the message is available for access and request authentication information from the second participant using the second device,
provide access to the received message on the second device upon receipt and validation of the authentication information from the second participant;
when the message is accessed by the second device, generate a hash of the accessed message and generate additional transaction information related to the accessed message; and
provide the hash of the accessed message and the additional transaction information in the block or one or more additional blocks generated for the blockchain.

11. The system of claim 10, wherein the message comprises an audio message, a visual message, or a textual message.

12. The system of claim 10, wherein the system applies a hash function to electronic data of the message to generate the hash of the message.

13. The system of claim 12, wherein the hash function comprises a SHA256 or a RIPEMD function.

14. The system of claim 10, wherein the system displays information provided in the blockchain on the first or second device to provide a transaction history for the message.

15. The system of claim 10, wherein the transaction information includes a transaction identifier, a message type, a participant identifier, a status, and time information related to the message.

16. The system of claim 10, wherein the additional transaction information includes a transaction identifier, a message type, a participant identifier, a status, and time information related to the received message.

17. The system of claim 10, wherein the authentication information comprises multifactor authentication information.

18. The system of claim 10, wherein the authentication information includes a crypto key provided to the second participant.

19. A method for secure message transfer between a plurality of participants, comprising:
receiving message information from an electronic device managed by a participant of the plurality of participants;
creating a message including an audio message, a visual message, or a textual message based on the received message information;
generating a hash of the message by applying a hash function to electronic data of the message;
generating a transaction having transaction information related to the message, the transaction information including the hash of the message, information related to a message type, a participant identifier, and a time stamp related to creation of the message;
storing the transaction in a current block of a blockchain;

making the message available to one or more additional electronic devices managed by one or more additional participants of the plurality of participants to allow access to the message by the one or more additional devices;

notifying the one or more additional participants that the message is available for access and requesting authentication information from the one or more additional participants to enable access to the message using the one or more additional electronic devices;

upon receipt and validation of the authentication information from respective ones of the one or more additional participants, providing access to the message to the respective ones of the one or more additional devices;

when the message is accessed by the respective ones of the one or more additional devices, generating a hash of the accessed message by applying a hash function to electronic data of the accessed message;

generating an additional transaction having transaction information related to the accessed message, the transaction information of the additional transaction including the hash of the accessed message, a participant identifier, and a time stamp related to accessing of the accessed message; and storing the additional transaction to the current block or an additional block generated for the blockchain.

20. The method of claim 19, further comprising:

comparing the hash of the message and the hash the accessed message accessed by the respective ones of the one or more additional participants to determine whether the message was tampered with or altered; and if the hash values do not match or correspond, generate an alert or notification to be provided to the participate or one or more additional participants.

* * * * *